United States Patent
Kitagawa et al.

(10) Patent No.: US 11,530,828 B2
(45) Date of Patent: Dec. 20, 2022

(54) CONCENTRATION ESTIMATION DEVICE

(71) Applicant: DAIKIN INDUSTRIES, LTD., Osaka (JP)

(72) Inventors: Keita Kitagawa, Osaka (JP); Takuya Kazusa, Osaka (JP); Youichi Handa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 197 days.

(21) Appl. No.: 16/755,252

(22) PCT Filed: Aug. 23, 2018

(86) PCT No.: PCT/JP2018/031095
§ 371 (c)(1),
(2) Date: Apr. 10, 2020

(87) PCT Pub. No.: WO2019/087538
PCT Pub. Date: May 9, 2019

(65) Prior Publication Data
US 2020/0240658 A1    Jul. 30, 2020

(30) Foreign Application Priority Data

Oct. 30, 2017 (JP) .............................. JP2017-209735

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/52* (2018.01); *F24F 11/56* (2018.01); *F24F 11/64* (2018.01);
(Continued)

(58) Field of Classification Search
CPC ....... A61B 5/165; A61B 5/0077; A61B 3/113; A61B 5/7264; A61B 5/7267;
(Continued)

(56) References Cited

U.S. PATENT DOCUMENTS 7,505,621 B1 * 3/2009 Agrawal ............ G06K 9/00288
382/118
8,000,505 B2 * 8/2011 Gallagher ............ G06K 9/0061
382/117
(Continued)

FOREIGN PATENT DOCUMENTS

| JP | 6-265190 A | 9/1994 |
|---|---|---|
| JP | 2002-22238 A | 1/2002 |

(Continued)

OTHER PUBLICATIONS

International Search Report (PCT/ISA/210) issued in PCT/P2018/031095, dated Nov. 20, 2018.

*Primary Examiner* — Darrin D Dunn
(74) *Attorney, Agent, or Firm* — Birch, Stewart, Kolasch & Birch, LLP

(57) ABSTRACT

A camera takes an image of a user. A room environment information sensor detects room environment information about an environment in a room where the user is present. An estimation unit estimates a concentration degree of the user based on the image of the user taken by the camera and the room environment information sensed by the room environment information sensor.

13 Claims, 9 Drawing Sheets

(51) Int. Cl.
*F24F 11/65* (2018.01)
*G05B 19/042* (2006.01)
*F24F 11/77* (2018.01)
*F24F 11/80* (2018.01)
*F24F 11/56* (2018.01)
*F24F 11/52* (2018.01)
*G01J 5/00* (2022.01)
*G01P 13/00* (2006.01)
*F24F 110/70* (2018.01)
*F24F 120/14* (2018.01)
*F24F 110/10* (2018.01)
*G01J 5/48* (2022.01)

(52) U.S. Cl.
CPC .............. *F24F 11/65* (2018.01); *F24F 11/77* (2018.01); *F24F 11/80* (2018.01); *G01J 5/0025* (2013.01); *G01P 13/00* (2013.01); *G05B 19/042* (2013.01); *F24F 2110/10* (2018.01); *F24F 2110/70* (2018.01); *F24F 2120/14* (2018.01); *G01J 5/48* (2013.01); *G05B 2219/2614* (2013.01)

(58) Field of Classification Search
CPC .... A61B 5/7246; A61B 5/7275; G06N 20/00; G06N 3/08; G06K 9/00302; G06K 9/00845; G06K 2009/00939; G05B 15/02; G05B 13/0265; G05B 1/00; G05B 2219/2614
See application file for complete search history.

(56) References Cited

U.S. PATENT DOCUMENTS

| | | | | |
|---|---|---|---|---|
| 8,582,807 | B2 * | 11/2013 | Yang | G06K 9/4628 382/103 |
| 2006/0190822 | A1 * | 8/2006 | Basson | G06Q 10/10 715/700 |
| 2008/0002892 | A1 * | 1/2008 | Jelonek | H04N 21/812 382/224 |
| 2008/0254734 | A1 * | 10/2008 | Uenaka | F24F 1/0087 454/256 |
| 2010/0111375 | A1 * | 5/2010 | Jones | G06K 9/00281 382/118 |
| 2011/0205366 | A1 * | 8/2011 | Enohara | F24F 11/30 348/159 |
| 2015/0332166 | A1 * | 11/2015 | Ferens | G06N 20/00 706/11 |
| 2016/0327922 | A1 * | 11/2016 | Sekiguchi | G05B 1/00 |
| 2016/0334121 | A1 * | 11/2016 | Oobayashi | G05B 15/02 |
| 2016/0374600 | A1 * | 12/2016 | Short | A61B 5/7246 434/236 |
| 2017/0020432 | A1 * | 1/2017 | Kusukame | A61B 5/026 |
| 2018/0144280 | A1 * | 5/2018 | Bender | G06F 11/3438 |
| 2018/0144281 | A1 * | 5/2018 | Bender | G06Q 10/06 |
| 2019/0268999 | A1 * | 8/2019 | Oobayashi | F24F 11/74 |
| 2019/0290180 | A1 | 9/2019 | Kusukame | |
| 2020/0037416 | A1 * | 1/2020 | Oobayashi | H05B 47/155 |
| 2020/0057487 | A1 * | 2/2020 | Sicconi | G06T 7/174 |
| 2020/0226395 | A1 * | 7/2020 | Cordell | G06K 9/00805 |
| 2020/0240670 | A1 * | 7/2020 | Kitagawa | B60H 1/00 |

FOREIGN PATENT DOCUMENTS

| | | |
|---|---|---|
| JP | 2015-161425 A | 9/2015 |
| JP | 2016-35365 A | 3/2016 |
| JP | 2017-127616 A | 7/2017 |
| WO | WO 2015/107607 A1 | 7/2015 |
| WO | WO 2018/147544 A1 | 9/2016 |

* cited by examiner

FIG.3

| USER IDENTIFICATION INFORMATION | USER'S MOTION/STATE | CONCENTRATION DEGREE |
|---|---|---|
| U1 | MOVING HANDS ONLY/MOVING BODY LESS ACTIVELY/BLINKING LESS/PUPILS WIDENED | HIGH |
| U2 | MOVING BODY ACTIVELY/RESTING CHIN ON HAND/STRETCHING BODY/BLINKING MANY TIMES | LOW |
| ... | ... | ... |

63

ESTIMATION OF CONCENTRATION DEGREE

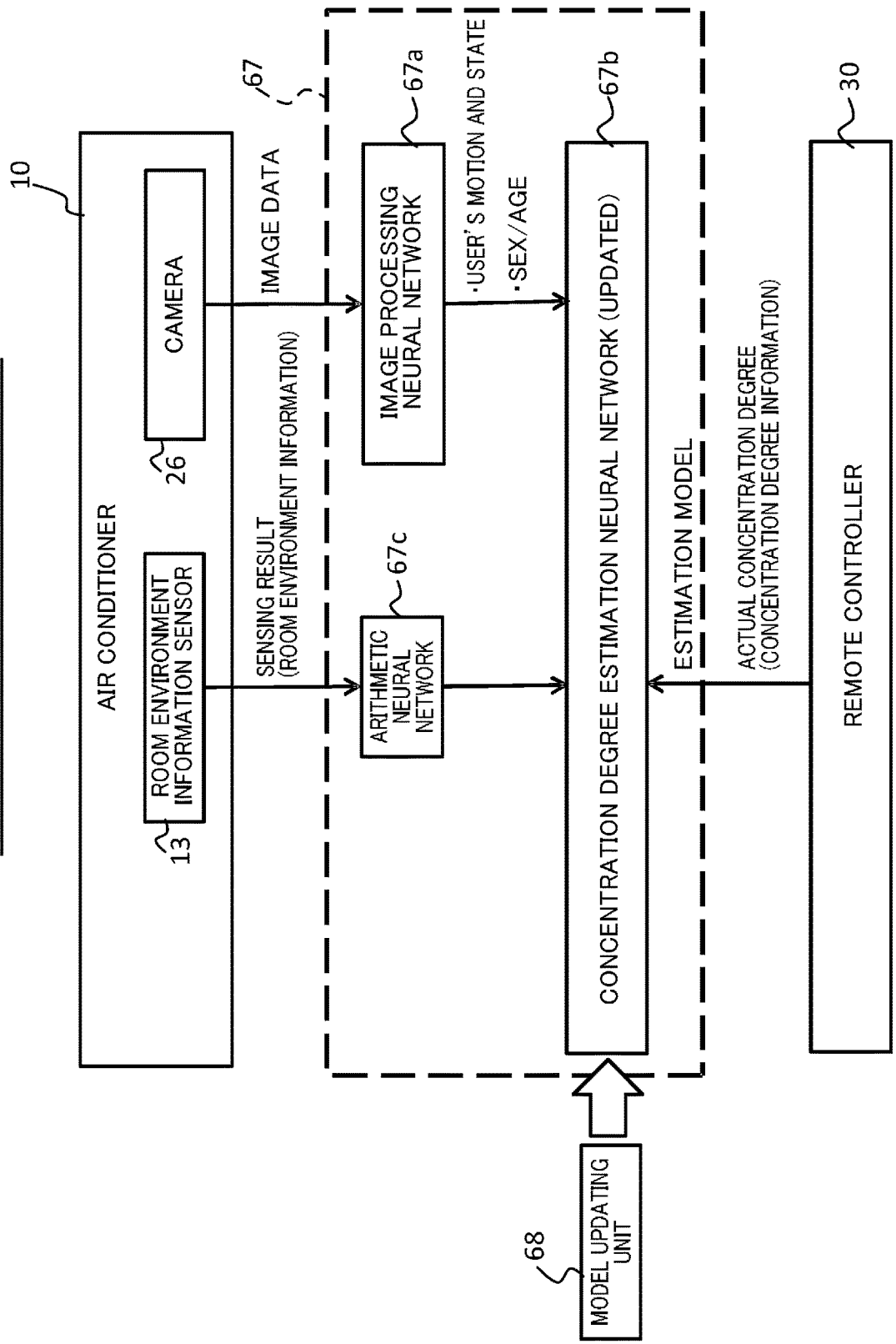

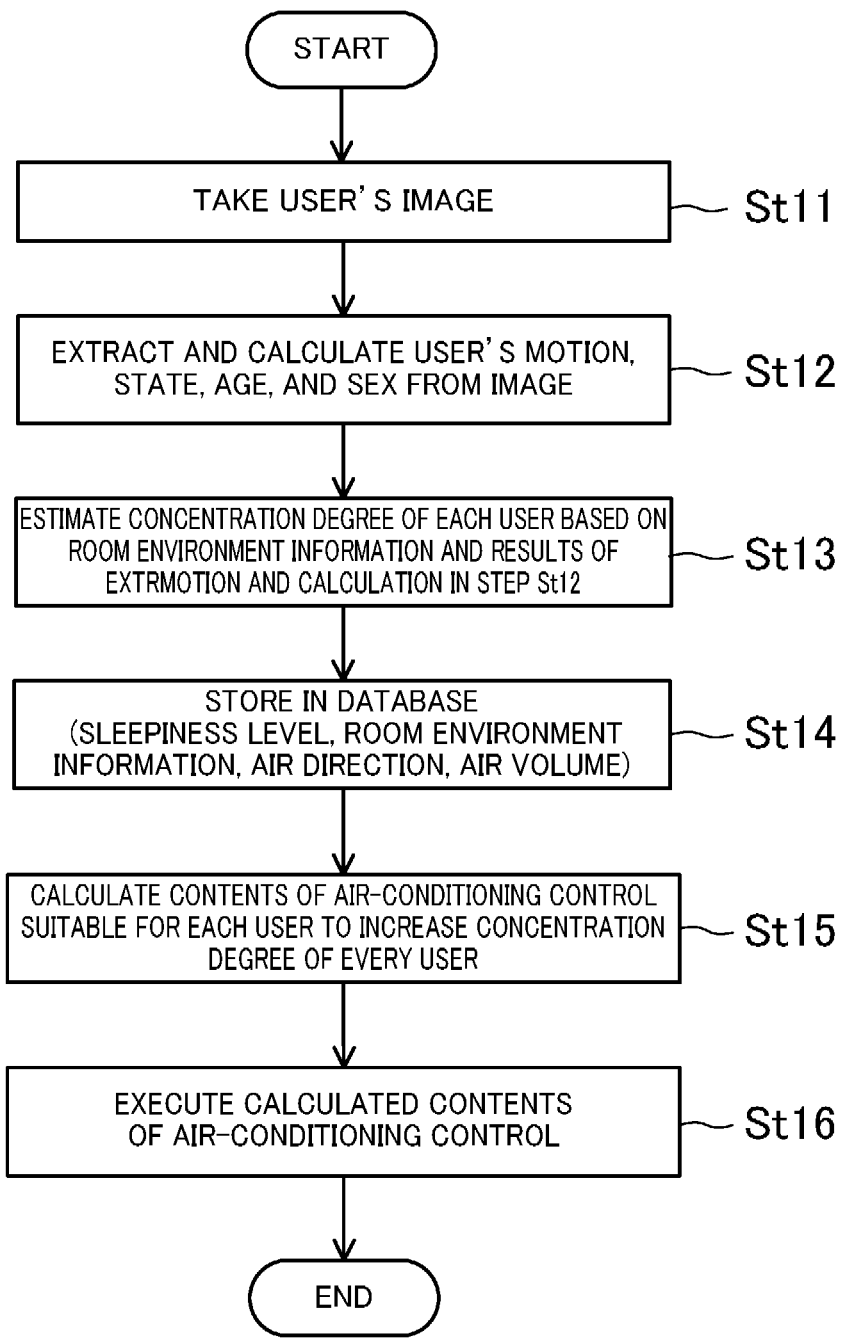

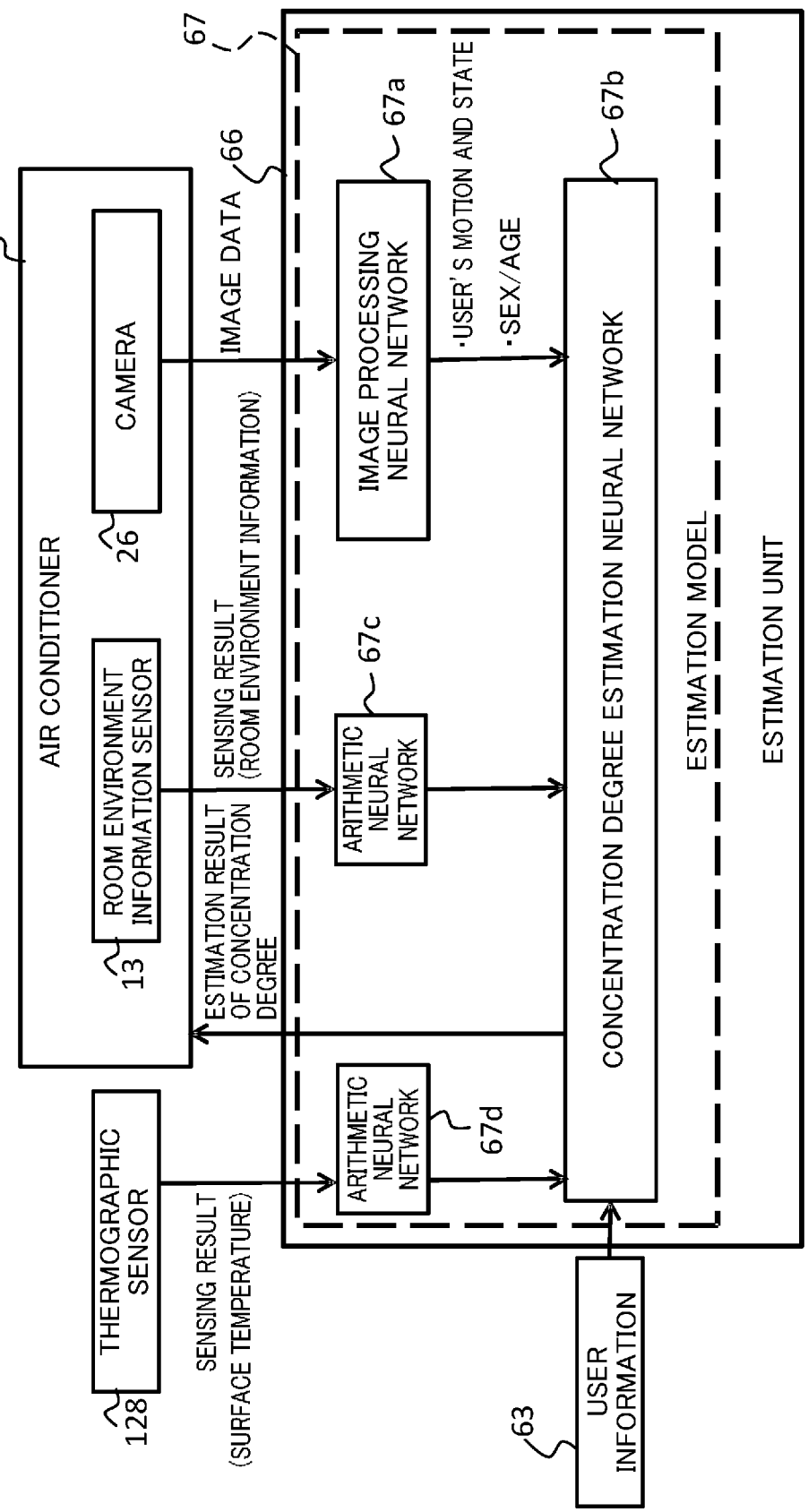

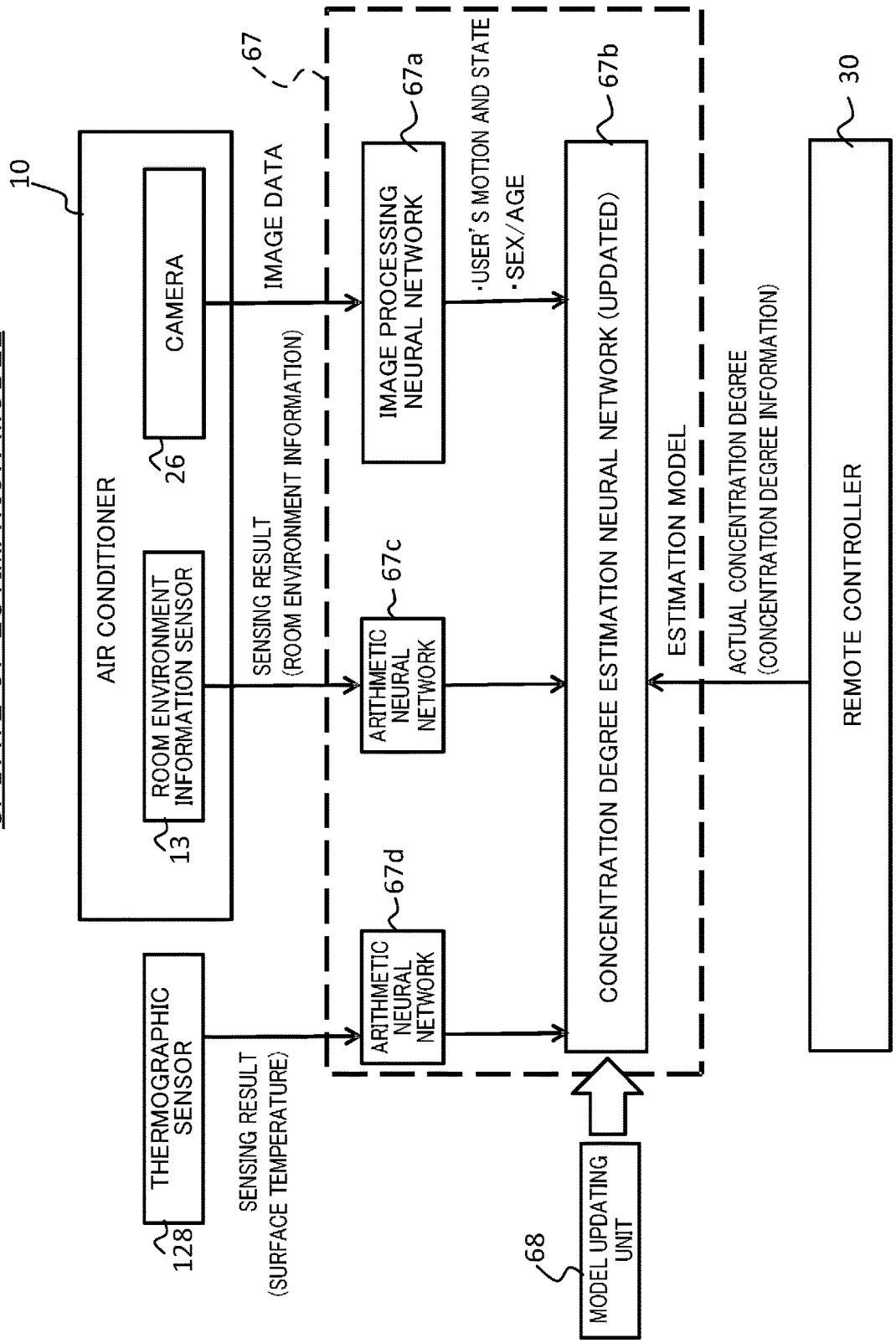

CONCENTRATION ESTIMATION DEVICE

TECHNICAL FIELD

The present invention relates to a concentration degree estimation apparatus.

BACKGROUND ART

As shown in Patent Document 1, there has been known a technique for extracting a motion of an operator (hereinafter referred to as a user) from a video image of a camera that takes an image of the user, and obtaining an evaluation value of the degree of concentration by using the extracted motion.

CITATION LIST

Patent Document

Patent Document 1: Japanese Unexamined Patent Publication No. 2016-35365

SUMMARY OF THE INVENTION

Technical Problem

The user is influenced by various factors associated with the user, which influence the user's concentration degree. Therefore, it is difficult to accurately recognize the operator's concentration degree only from the taken image.

An object of the present invention is to accurately recognize a concentration degree of a user.

Solution to the Problem

A first aspect of the present disclosure is directed to a concentration degree estimation apparatus comprising: an imaging unit (26) that takes an image of at least one user (U1, U2, U3); a sensor (13) that senses room environment information about an environment of a room (r1) where the at least one user (U1, U2, U3) is present; and an estimation unit (66) that estimates a concentration degree of the at least one user (U1, U2, U3) based on the image of the at least one user (U1, U2, U3) taken by the imaging unit (26) and the room environment information sensed by the sensor (13).

Examples of the room environment information include the $CO_2$ concentration and the temperature in the room. Such room environment information may be a factor influencing the concentration degree of the user. Here, taking an image of the user allows the user's concentration degree to be estimated based on the image and the room environment information. Thus, the concentration degree of the user can be accurately recognized.

A second aspect of the present disclosure is an embodiment of the first aspect. In the second aspect, the image shows a motion and/or a state of the at least one user (U1, U2, U3) representing the concentration degree of the at least one user (U1, U2, U3), and the estimation unit (66) extracts the motion and/or state of the at least one user (U1, U2, U3) from the image to estimate the concentration degree of the at least one user (U1, U2, U3).

Thus, the concentration degree representing how much the user is in concentration is estimated more accurately.

A third aspect of the present disclosure is an embodiment of the first or second aspect. In the third aspect, the estimation unit (66) calculates sex and/or an age of the at least one user (U1, U2, U3) from the image, and estimates the concentration degree of the at least one user (U1, U2, U3) based on the calculated sex and/or age of the at least one user (U1, U2, U3).

This further improves the estimation accuracy of the concentration degree of the user.

A fourth aspect is an embodiment of any one of the first to third aspects. In the fourth aspect, the concentration degree estimation apparatus further includes a surface temperature measuring unit (128) that measures a surface temperature of the at least one user (U1, U2, U3) present in the room (r1). The estimation unit (66) estimates the concentration degree of the at least one user (U1, U2, U3) also based on a measurement result of the surface temperature measuring unit (128).

This further improves the estimation accuracy of the concentration degree of the user.

A fifth aspect is an embodiment of any one of the first to fourth aspects. In the fifth aspect, the air conditioner (10) is installed in a ceiling of the room (r1), and the imaging unit (26) is provided for the air conditioner (10).

This allows the imaging unit (26) to take an image of the user in the room with reduced possibility that the user is blocked by some obstacles.

A sixth aspect is an embodiment of any one of the first to fifth aspects. In the sixth aspect, if the at least one user (U1, U2, U3) includes users (U1, U2, U3) present in the room (r1), the estimation unit (66) estimates the concentration degree of each of the users (U1, U2, U3).

A seventh aspect is an embodiment of the sixth aspect. In the seventh aspect, the concentration degree estimation apparatus further includes: a storage unit (62) that stores user information (63) about each of the users (U1, U2, U3), the user information including the motion and/or state of the user (U1, U2, U3) associated with the concentration degree of the user (U1, U2, U3) who is showing the motion and/or the state. The estimation unit (66) extracts the motion and/or state of each of the users (U1, U2, U3) from the image, and estimates the concentration degree of the user (U1, U2, U3) using the extraction result and the user information (63).

This further improves the estimation accuracy of the concentration degree of each user.

An eighth aspect is an embodiment of any one of the first to seventh aspects. In the eighth aspect, the concentration degree estimation apparatus further includes: a receiving unit (30) capable of receiving the concentration degree information inputted by the at least one user (U1, U2, U3), the concentration degree information representing the concentration degree of the at least one user (U1, U2, U3); and a model updating unit (68) that learns for an estimation model (67) used for estimating the concentration degree based on the image taken by the imaging unit (26) and/or the concentration degree information received via the receiving unit (30).

Performing the operation of estimating the concentration degree of the user using the estimation model that has learned further improves the estimation accuracy of the concentration degree of the user.

A ninth aspect is an embodiment of any one of the first to seventh aspects. In the ninth aspect, the concentration degree estimation apparatus further includes a control unit (14) that controls a first air-conditioning operation of the air conditioner (10) based on an estimation result of the estimation unit (66) so that the concentration degree of the at least one user (U1, U2, U3) increases, the air conditioner (10) targeting the room (r1).

This improves the estimation accuracy of the concentration degree of the user.

A tenth aspect is an embodiment of the ninth aspect. In the tenth aspect, the concentration degree estimation apparatus further includes a model updating unit (68) that recognizes an actual concentration degree of the user (U1, U2, U3) from the image taken by the imaging unit (26) after the first air-conditioning operation performed based on the estimation result of the estimation unit (66), and learns for the estimation model (67) used for estimating the concentration degree based on a recognition result.

This further improves the accuracy of the estimation model so that the result of the estimation using the estimation model matches an actual concentration degree as much as possible. Performing the operation of estimating the concentration degree of the user using the estimation model that has learned further improves the estimation accuracy of the concentration degree of the user.

An eleventh aspect is an embodiment of the ninth or tenth aspect. In the eleventh aspect, the concentration degree estimation apparatus further includes a model updating unit (68) that learns for the estimation model (67) used for estimating the concentration degree based on a change in the motion and state of the at least one user (U1, U2, U3) based on which the concentration degree of the at least one user (U1, U2, U3) has been determined through comparison between the image taken by the imaging unit (26) after the first air-conditioning operation performed based on the estimation result of the estimation unit (66) and the image taken by the imaging unit (26) before the first air-conditioning operation.

This further improves the accuracy of the estimation model so that the result of the estimation using the estimation model matches an actual concentration degree as much as possible. Performing the operation of estimating the concentration degree of the user using the estimation model that has learned further improves the estimation accuracy of the concentration degree of the user.

A twelfth aspect is an embodiment of the eleventh aspect. In the twelfth aspect, the change in the motion and state of the at least one user (U1, U2, U3) based on which the concentration degree of the at least one user (U1, U2, U3) has been determined is a decrease in frequency of the motion and state, or an absence of the motion and state.

As a result, whether or not the result of the estimation using the estimation model matches an actual concentration degree is determined more accurately.

A thirteenth aspect is an embodiment of any one of the ninth to twelfth aspects. In the thirteenth aspect, the concentration degree estimation apparatus further includes a receiving unit (30) capable of receiving concentration degree information inputted by the at least one user (U1, U2, U3), the concentration degree information representing the concentration degree of the at least one user (U1, U2, U3). The control unit (14) learns a particular of control of the first air-conditioning operation based on the concentration degree information received via the receiving unit (30) after the first air-conditioning operation performed based on the estimation result of the estimation unit (66) so that the concentration degree of the at least one user (U1, U2, U3) increases.

Thus, the first air-conditioning operation to be performed next improves the concentration degree of the user (U1, U2, U3) more easily.

A fourteenth aspect is an embodiment of any one of the ninth to thirteenth aspects. In the fourteenth aspect, the control unit (14) learns a particular of control of the first air-conditioning operation based on the image taken by the imaging unit (26) after the first air-conditioning operation performed based on the estimation result of the estimation unit (66) so that the concentration degree of the at least one user (U1, U2, U3) increases.

Thus, the first air-conditioning operation to be performed next improves the concentration degree of the user (U1, U2, U3) more easily.

A fifteenth aspect is an embodiment of the thirteenth or fourteenth aspect. In the fifteenth aspect, the particular of the control of the first air-conditioning operation include at least one of a rotational speed of an indoor fan (12) included in the air conditioner (10), a position of a flap (16) for adjusting a direction of air blown out from the air conditioner (10), a set temperature of the air conditioner (10), or a target $CO_2$ concentration in the room (r1).

Thus, the first air-conditioning operation to be performed next improves the concentration degree of the user (U1, U2, U3) easily and reliably.

Advantages of the Invention

According to the aspects of the present disclosure, the concentration degree of the user can be accurately recognized.

BRIEF DESCRIPTION OF THE DRAWINGS

FIG. 3 is a conceptual diagram of user information.

FIG. 6 is a conceptual diagram illustrating input and output of an estimation model in updating of the estimation model according to the first embodiment.

FIG. 7 is a flowchart illustrating an operation of estimating a concentration degree of a user and an air-conditioning operation performed in accordance with the estimated user's concentration degree.

FIG. 8 is a conceptual diagram illustrating input and output of an estimation model in estimation of a concentration degree according to a second embodiment.

FIG. 9 is a conceptual diagram illustrating input and output of an estimation model in updating of the estimation model according to the second embodiment.

DESCRIPTION OF EMBODIMENTS

Embodiments of the present disclosure will be described in detail with reference to the drawings. The following embodiments are merely exemplary ones in nature, and are not intended to limit the scope, applications, or use of the present invention.

First Embodiment

<Outline>

Figure 1:
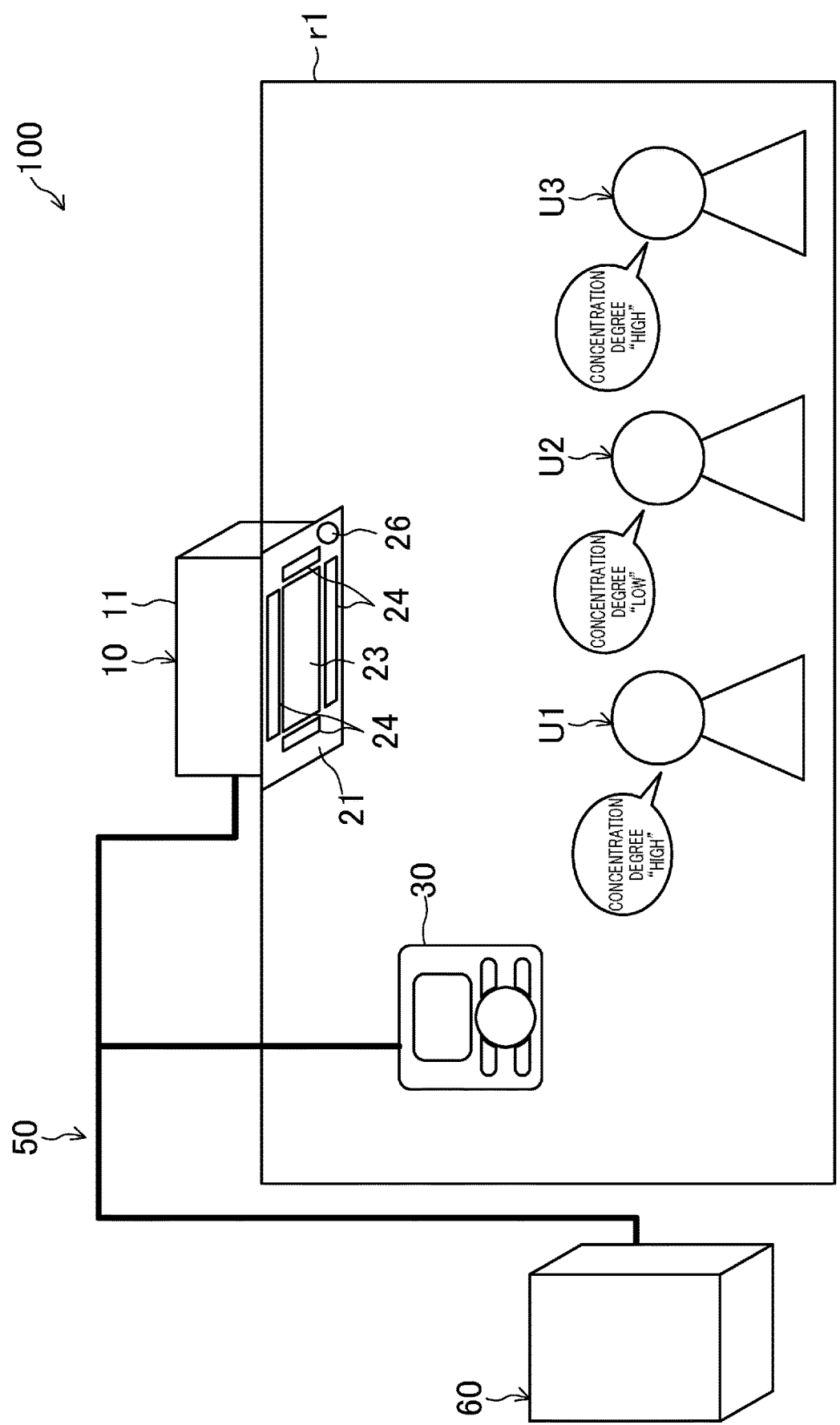
FIG. 1 is an external view of an air-conditioning system including a concentration degree estimation apparatus.
Figure 2:
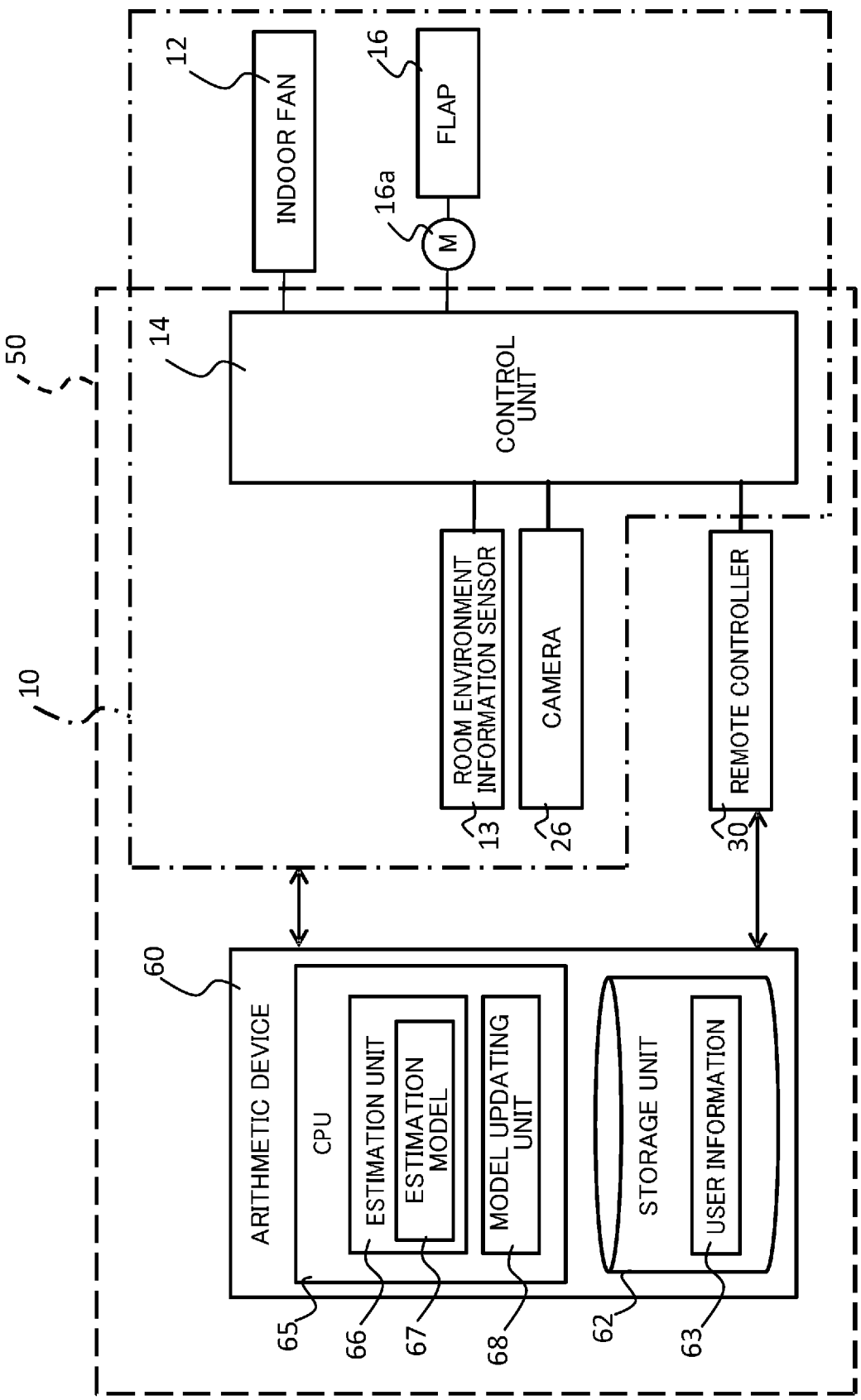
FIG. 2 is a block diagram schematically illustrating a configuration of the air-conditioning system including the concentration degree estimation apparatus.

FIG. 1 is an external view illustrating an air-conditioning system (100) including an air-conditioning control apparatus (50) (corresponding to a concentration degree estimation apparatus) of the present embodiment. As shown in FIGS. 1 and 2, the air-conditioning control apparatus (50) includes some of components of an air conditioner (10), a remote controller (30) (corresponding to a receiving unit), and an arithmetic device (60).

As shown in FIG. 1, the air conditioner (10) is provided in a room (r1) which is a target to be air-conditioned, and conditions the air in the room (r1). The remote controller (30) is used by a user (U1, U2, U3) to directly give an instruction to the air conditioner (10) to set a target temperature and humidity of the air conditioner (10), select an operating mode of the air conditioner (10), and turn the air conditioner (10) on or off through operation of the remote controller (30).

The air-conditioning control apparatus (50) controls an air-conditioning operation of the air conditioner (10). In particular, the air-conditioning control apparatus (50) of the present embodiment estimates a concentration degree of the user (U1, U2, U3) by using an image showing the user (U1, U2, U3) present in the room (r1), and controls the air-conditioning operation (corresponding to a first air-conditioning operation) of the air conditioner (10) based on the estimated concentration degree, thereby providing an environment which improves the concentration degree of the user (U1, U2, U3) doing office work, for example.

<Configuration of Air Conditioner>

The air conditioner (10) is an air conditioner installed in a ceiling, and has a body (11) embedded in a ceiling of the room (r1). A bottom surface (21) of the body (11) is exposed in the room (r1), and has an air inlet (23) through which the air is sucked into the body (11), and an air outlet (24) through which the air is blown out of the body (11) into the room (r1).

A camera (26) (corresponding to an imaging unit) is provided on the bottom surface (21) of the body (11).

The camera (26) has a lens (not shown) facing downward of the air conditioner (10) to take an image of the user (U1, U2, U3) present in the room (r1). The image may be a moving image of the user (U1, U2, U3), or still images of the user (U1, U2, U3) successively taken, but in this example, the image is a moving image. The image taken by the camera (26) shows a motion and state (including facial expressions) of the user (U1, U2, U3) representing the concentration degree of the user (U1, U2, U3). The user (U1, U2, U3) who is in concentration shows a motion and state, e.g., moves the hands only while moving the body less actively, blinks less, or has slightly widened pupils. Conversely, the user (U1, U2, U3) who is not in concentration shows a motion and state, e.g., moves the body actively, rests the chin on hand, stretches the body, or blinks many times. The camera (26) takes an image of such motion and state of the user (U1, U2, U3) as an image representing the concentration degree of the user (U1, U2, U3).

The body (11) of the air conditioner (10) includes a heat exchanger (not shown) that exchanges heat between a refrigerant and the air sucked into the body (11) through the air inlet (23), an indoor fan (12) that supplies the air that has exchanged heat with the refrigerant into the room (r1) through the air outlet (24), a flap (16) provided for the air outlet (24) to adjust the direction of the air, and a motor (16a) connected to a rotary shaft of the flap (16) to serve as a drive source for changing the orientation of the flap (16) (see FIG. 2).

The body (11) further includes therein a room environment information sensor (13) (corresponding to a sensor), and a control unit (14).

The room environment information sensor (13) senses room environment information about the environment in the room (r1), and is a suction sensor provided near the air inlet (23). The room environment information includes, for example, a temperature, humidity, and $CO_2$ concentration of the air in the room (r1) sucked through the air inlet (23).

The control unit (14) is a microcomputer including a CPU and a memory. The control unit (14) is electrically connected to the indoor fan (12), the motor (16a) of the flap (16), the room environment information sensor (13), the camera (26), and other components. The control unit (14) is also connected to the remote controller (30) and the arithmetic device (60) to be able to communicate with them.

The control unit (14) controls the air-conditioning operation of the air conditioner (10) by controlling the drive of the indoor fan (12), the motor (16a) of the flap (16), and any other suitable components based on the sensing result of the room environment information sensor (13).

In particular, the control unit (14) of the present embodiment controls the air-conditioning operation (the first air-conditioning operation) of the air conditioner (10) in the room (r1) based on the concentration degree of the user (U1, U2, U3) estimated by the arithmetic device (60) so that the concentration degree of the user (U1, U2, U3) increases. Details of the air-conditioning operation based on the estimation result of the concentration degree will be described later.

In a preferred embodiment, the control unit (14) has a neural network constructed in advance, similarly to an estimation unit (66) of the arithmetic device (60) described below. This is for finer adjustment of the air-conditioning operation.

<Remote Controller>

The remote controller (30) is attached to a wall surface of the room (r1). Although not shown, the remote controller (30) includes a display showing various screens, and operation buttons used by the user (U1, U2, U3) to operate. If the user (U1, U2, U3) uses the operation buttons to operate, the various screens associated with the operation of the user (U1, U2, U3) are shown on the display. The display shows the set temperature, the set humidity, and other elements of air in the room (r1) as a normal screen.

The remote controller (30) of the present embodiment is capable of receiving concentration degree information inputted by the user (U1, U2, U3), the concentration degree information representing an actual concentration degree of the user (U1, U2, U3), such as the user is not in concentration. Based on the inputted concentration degree information, the arithmetic device (60) can determine whether or not the estimated concentration degree of the user (U1, U2, U3) matches the actual concentration degree of the user (U1, U2, U3). In view of the fact that the air conditioner (10) performs the air-conditioning operation based on the estimated concentration degree of the user (U1, U2, U3), the information is preferably inputted while the air conditioner (10) is performing the air-conditioning operation based on the estimated concentration degree of the user (U1, U2, U3), but this is not limiting. The inputted information may be used for correction of the particular of control of the air-conditioning operation performed by the air conditioner (10) in accordance with the estimated concentration degree of the user (U1, U2, U3) (e.g., for adjustment of a rotational speed of the indoor fan (12) in accordance with the actual concentration degree).

<Configuration of Air-Conditioning Control Apparatus>

As shown in FIG. 2, the air-conditioning control apparatus (50) includes the remote controller (30) corresponding to the receiving unit and the arithmetic device (60) in addition to the room environment information sensor (13), the control unit (14), and the camera (26), which are some of the components of the air conditioner (10).

Since the room environment information sensor (13), the control unit (14), the camera (26), and the remote controller (30) have already been described above, the following description focuses on the arithmetic device (60).

<Arithmetic Device>

The arithmetic device (60) is a computer including a storage unit (62) and a CPU (65), and mainly performs estimation of the concentration degree of the user (U1, U2, U3). The arithmetic device (60) may be a cloud server, or a local server.

The arithmetic device (60) is connected to the air conditioner (10) and the remote controller (30) to be able to communicate with each other via wires or wirelessly. Thus, the arithmetic device (60) can acquire the sensing result of the room environment information sensor (13) such as the temperature or the like of the room (r1), and the image taken by the camera (26) from the air conditioner (10), and can acquire the concentration degree information representing the actual concentration degree, if inputted by the user (U1, U2, U3) via the remote controller (30). The arithmetic device (60) can output the result of estimation performed by itself, i.e., the concentration degree, to the control unit (14) of the air conditioner (10).

In this embodiment, the arithmetic device (60) is configured as a device different from the air conditioner (10). However, similarly to the control unit (14), the arithmetic device (60) may be a microcomputer including a CPU and a memory, and may be incorporated in the air conditioner (10).

The storage unit (62) is a nonvolatile storage device such as a flash memory and a hard disk. The storage unit (62) mainly stores user information (63).

As shown in FIG. 3, the user information (63) is information about the motion and state (including facial expressions) of each user (U1, U2, U3) associated with the concentration degree of the user (U1, U2, U3) who is showing the motion and state. The motions and expressions that the user naturally show when the user is in concentration and out of concentration may be different for each user (U1, U2, U3). That is, it is considered that the users (U1, U2, U3) have different habits in terms of the motion and expression exhibiting the concentration degree. Therefore, the user information (63) is defined as a criterion that indicates the concentration degree of each user (U1, U2, U3).

The CPU (65) functions as an estimation unit (66) and a model updating unit (68) by reading and executing various programs stored in the storage unit (62) and other memory than the storage unit (62).

—Estimation of User's Concentration Degree—

The estimation unit (66) estimates the concentration degree of the user (U1, U2, U3) using the image of the user (U1, U2, U3) taken by the camera (26) and the room environment information which is the sensing result of the room environment information sensor (13). This estimation unit (66) includes an estimation model (67).

The estimation model (67) is a dedicated model for determining the concentration degree of the user (U1, U2, U3) from the taken image or other materials through an arithmetic operation using a technique such as deep learning, and is previously constructed as a neural network. As shown in a dashed box in FIG. 4, the estimation model (67) of the present embodiment is mainly a two-layer neural network including an image processing neural network (67*a*) that performs image processing on the data of the image taken by the camera (26), and a concentration degree estimation neural network (67*b*) that estimates the concentration degree of the user (U1, U2, U3) from the result of the image processing and the information about the sensing result of the room environment information sensor (13).

The estimation unit (66) first inputs the data of the image taken by the camera (26) to the image processing neural network (67*a*). Through synchronization, edge detection, contrast processing, or any other suitable processing on the image data (moving image data in this example), the image processing neural network (67*a*) extracts the motion of the user (U1, U2, U3) such as stretching the body, extracts the state of the user (U1, U2, U3) such as blinking less, calculates the sex of the user (U1, U2, U3), and calculates the age of the user (U1, U2, U3). Specifically, in the image processing neural network (67*a*), the particular motion and state of the user (U1, U2, U3) representing the concentration degree are extracted, and an arithmetic operation for obtaining the sex and age of the user that are related to the concentration degree is performed.

Figure 5:
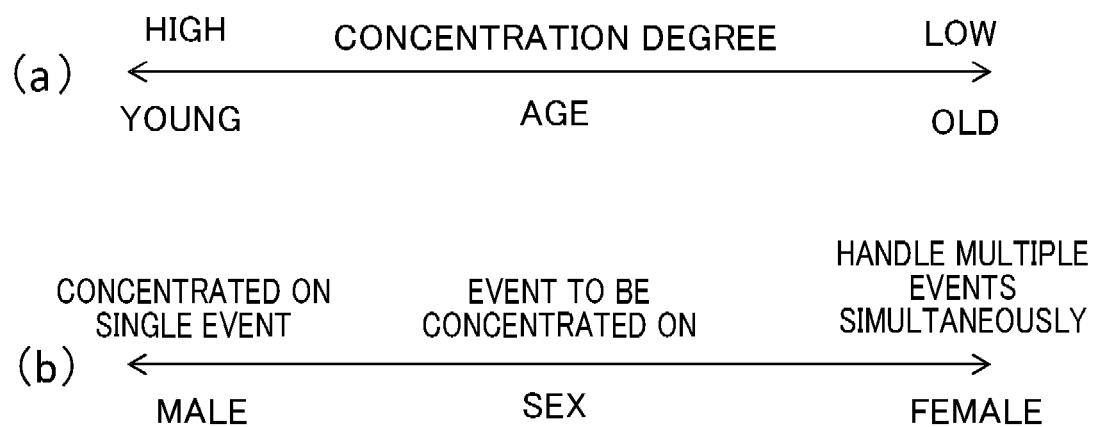
FIGS. 5A and 5B are diagrams illustrating examples of a relationship between age and concentration degree and a relationship between sex and a matter pertaining the concentration, respectively.

FIG. 5A conceptually shows an example of a relationship between the age and the concentration degree, and FIG. 5B an example of a relationship between the sex and a matter pertaining the concentration. If the temperature of the room (r1) is uniform at a certain level, the users (U1, U2, U3) of younger ages are more apt to show a high concentration degree and stay concentrated for a long time, and the users (U1, U2, U3) of older ages are more apt to show a low concentration degree and lose concentration in a short time as shown in FIG. 5A. FIG. 5B shows that in comparison between females and males of the same age, the former tend to handle multiple events simultaneously, while the latter tend to concentrate on a single event. The sex and age obtained are thus one of the indices that influence (or are related to) the concentration degree.

Figure 4:
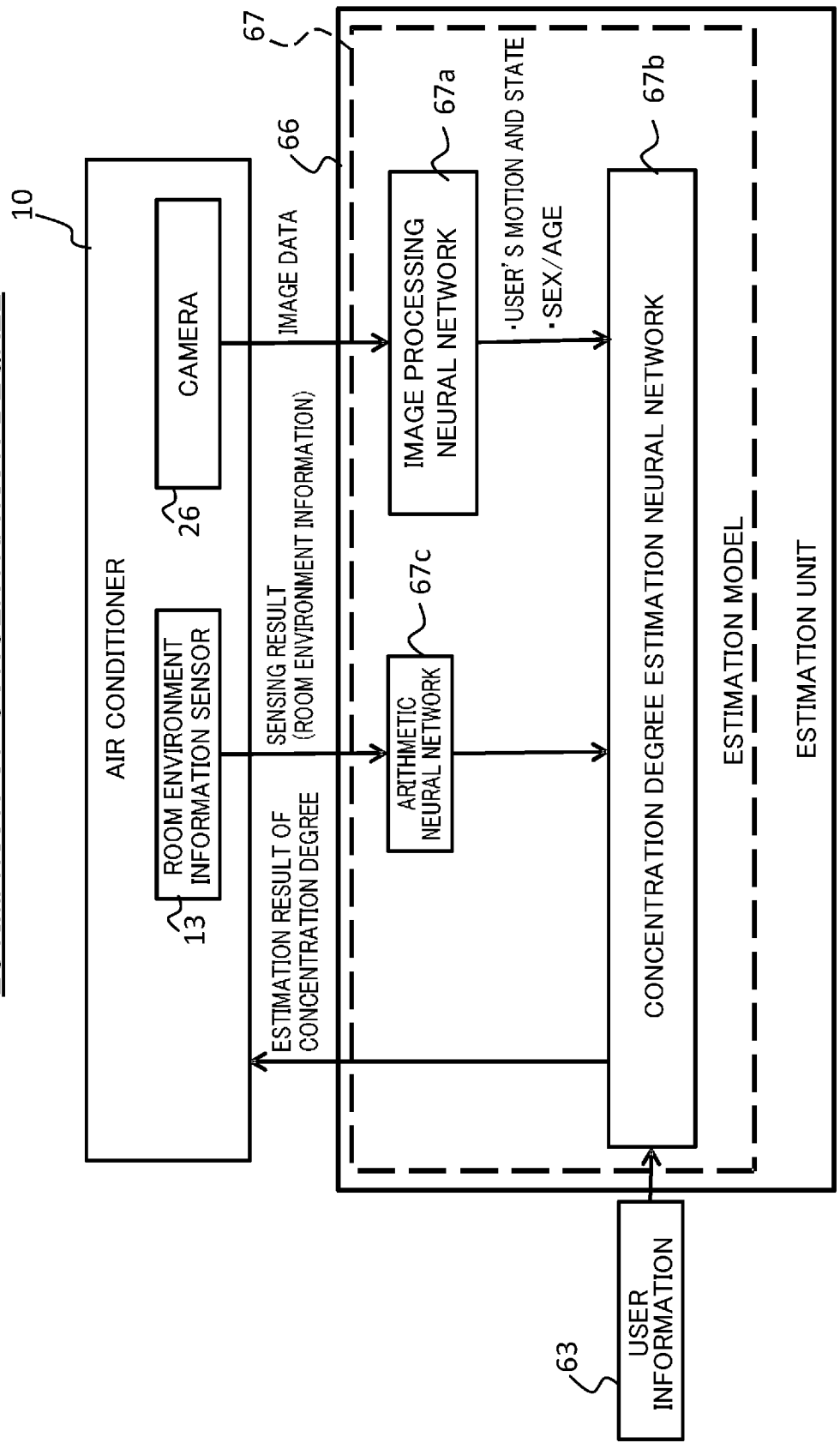
FIG. 4 is a conceptual diagram illustrating input and output of an estimation model in estimation of a concentration degree according to a first embodiment.

As shown in FIG. 4, the concentration degree estimation neural network (67*b*) receives the results of extraction and arithmetic operation of the image processing neural network (67*a*), and information about the sensing result (room environment information) of the room environment information sensor (13) such as the temperature, humidity, and $CO_2$ concentration in the room (r1). This embodiment shows an example in which the sensing result of the room environment information sensor (13) undergoes a predetermined arithmetic operation in an arithmetic neural network (67*c*) of the estimation model (67) to be converted to data that can be handled by the concentration degree estimation neural network (67*b*), and then is inputted to the concentration degree estimation neural network (67*b*) as the information about the sensing result of the room environment information sensor (13). However, the sensing result may be directly inputted to the concentration degree estimation neural network (67*b*) without being processed in the arithmetic neural network (67*c*).

In the concentration degree estimation neural network (67*b*), among the inputted various types of information, the extraction result, which is the particular motion and state of the user (U1, U2, U3) representing the concentration degree, and the information about the sensing result of the room environment information sensor (13), are used to obtain the concentration degree of each user (U1, U2, U3) with reference to the user information (63) shown in FIG. 3. In this case, the inputted results of the arithmetic operation, i.e., the sex and the age of the user (U1, U2, U3), are taken into account in the calculation of the concentration degree of each user (U1, U2, U3).

For example, the concentration degree of the user (U1, U2, U3) tends to decrease if the temperature of the room (r1) exceeds about 25° C. and the $CO_2$ concentration increases. Therefore, the information about the sensing result of the room environment information sensor (13) is used together with the particular motion and state of the user (U1, U2, U3) to estimate the concentration degree of each user (U1, U2, U3). If the relationship between the sex and the concentration degree and the relationship between the age and the concentration degree shown in FIGS. 5A and 5B are taken into consideration, the concentration degree of each user (U1, U2, U3) is estimated more finely.

The estimation unit (66) transmits the concentration degree of the user (U1, U2, U3) obtained in this manner to the control unit (14) of the air conditioner (10) as the estimation result of the concentration degree.

—Update of Estimation Model—

As shown in FIG. 6, the model updating unit (68) learns for the estimation model (67) based on the data of the image taken by the camera (26) and the concentration degree information representing the actual concentration degree of the user (U1, U2, U3) received via the remote controller (30).

An image newly taken by the camera (26) after the estimation of the concentration degree may show, for example, a desired change in the motion and state of the user (U1, U2, U3), such as a decrease in the number of blinks. In this case, it can be determined that the estimation of the concentration degree is relatively satisfactory, and the air-conditioning operation (i.e., the first air-conditioning operation) performed based on the estimation result is increasing the concentration degree of the user (U1, U2, U3). However, if such a desired change is not observed, the estimation of the concentration degree may deviate from the actual concentration degree. Thus, the model updating unit (68) updates the estimation model (67) using the image newly taken by the camera (26).

As mentioned above, the motion and state of the user (U1, U2, U3) representing the concentration degree include, in addition to the number of blinks, how much the user moves the hands or body, how much the pupils are widened, whether or not the user rests the chin on hand, and whether or not the user stretches the body. If a desired change in these motions and states representing improvement in the concentration degree is observed, the air-conditioning operation (i.e., the first air-conditioning operation) based on the estimation result can be determined as increasing the concentration degree of the user (U1, U2, U3), and the model updating unit (68) updates the estimation model (67).

For each motion and state, specific examples of grounds for the determination that the concentration degree is improved (increased) are described below.

(I) The movement of the body per fixed time that was active before the air-conditioning operation becomes less active, and the hands are moved more actively after the air-conditioning operation.

(II) The user who was resting the chin on hand before the air-conditioning operation stopped resting the chin on hand after the air-conditioning operation.

(III) The user who was stretching the body before the air-conditioning operation stopped stretching the body after the air-conditioning operation.

(IV) The pupils are more widened after the air-conditioning operation than before the air-conditioning operation.

As can be seen from these examples, whether the concentration degree is improved can be determined not only from whether some motion and state is found, but also from an increase or decrease in the frequency of such motion and state, and these will be collectively referred to as a "desired change." If such a desired change is recognized from the image of the camera (26), the estimation by the estimation operation of the concentration degree can be determined to be roughly identical to the actual concentration degree, and the estimation model (67) is not updated.

The concentration degree information that the user (U1, U2, U3) inputted via the remote controller (30) indicates the actual concentration degree of the user (U1, U2, U3). Therefore, the model updating unit (68) also uses the concentration degree information received via the remote controller (30) to update the estimation model (67).

Through such an updating operation, the estimation model (67) (specifically, the concentration degree estimation neural network (67b)) is updated to a model that can calculate an estimation result that is closer to the actual concentration degree.

If a desired change is found as a result of comparison between the motion and state of the user (U1, U2, U3) shown in the previously taken image and the motion and state of the user (U1, U2, U3) shown in the newly taken image, and/or when the concentration degree information that the remote controller (30) received indicates that the concentration degree has become higher by a predetermined level or more than the one received last time, the model updating unit (68) determines that the updating of the estimation model (67) is unnecessary, and may not update the estimation model (67). That is, the estimation model (67) may be updated if no desired change in the motion and state of the user (U1, U2, U3) is found as a result of comparison between the previously taken image and the newly taken image, and/or when the concentration degree information received via the remote controller (30) is equal to or greater than the desired level. This can reduce the increase in load due to unnecessary processing performed by the CPU (65).

In this embodiment, the estimation model (67) to be updated is the concentration degree estimation neural network (67b), but the image processing neural network (67a) and the arithmetic neural network (67c) may also be the targets to be updated.

As shown in FIG. 6, in the updating of the estimation model (67), the sensing result of the room environment information sensor (13) may also be used, or may not be used.

<Air Conditioning Operation in accordance with Estimated User's Concentration Degree>

FIG. 7 is a flowchart illustrating the operation of estimating the concentration degree of the user (U1, U2, U3) and the air-conditioning operation in accordance with the estimated user's concentration degree.

The camera (26) takes an image of a user (U1, U2, U3) (St11). The image taken by the camera (26) is transmitted to the arithmetic device (60).

Using the image processing neural network (67a) in the estimation model (67), the estimation unit (66) in the arithmetic device (60) extracts the motion and state of the user (U1, U2, U3), and performs an arithmetic operation to obtain the sex and age of the user (U1, U2, U3) (St12). The estimation unit (66) inputs the results of the extraction and arithmetic operation obtained in Step St12 and the room environment information which is the sensing result of the room environment information sensor (13) (in this example, the information about the sensing result) to the concentration degree estimation neural network (67b) in the estimation model (67), and estimates the concentration degree of the user (U1, U2, U3) (St13). The estimation result of the concentration degree is transmitted to the control unit (14) of the air conditioner (10).

Although not shown, the estimation result is stored in a database included in the arithmetic device (60) (St14). At this time, in addition to the estimation result, the room environment information including the temperature of the room (r1), and the direction and volume of the air blown from the air conditioner (10) are also stored in association in the database. The database may be used for updating the estimation model (67) in order to improve the accuracy of the estimation operation of the concentration degree. In a more preferred embodiment, the database is used to correct the following "threshold value" to an optimal value.

The control unit (14) of the air conditioner (10) calculates the particular of air-conditioning control suitable for each user (U1, U2, U3) so that the estimated concentration degree is increased to a threshold value or more (St15), and executes the calculated air-conditioning control (St16). For example, the control unit (14) executes the particular of air-conditioning control for supplying a fluctuating airflow to the user (U1, U2, U3) whose concentration degree greatly differs from the threshold value. The fluctuating airflow is generated by moving a wind direction changing vane provided for the air outlet (24) up and down while increasing and decreasing the volume of the air over time. The user (U1, U2, U3) to which the fluctuating airflow is supplied can feel comfortable rather than uncomfortable. Conversely, the control unit (14) executes the particular of air-conditioning control for maintaining the current air supply to the user (U1, U2, U3) whose concentration degree does not greatly differ from the threshold value.

Further, if there is a large number of users (U1, U2, U3) whose concentration degree differs from the threshold value by a value greater than a predetermined value, the control unit (14) may execute the particular of air-conditioning control for adjusting the degree of heating or cooling the supply air so that the temperature of the room (r1) is set within a range of 18° C. to 25° C. in which the user can be easily in concentration.

In this manner, the particular of air-conditioning control for changing the direction and volume of the air supplied to each user (U1, U2, U3) is calculated and executed according to the magnitude of the difference between the concentration degree of the user (U1, U2, U3) and the threshold value. It can be said that the above-described particular of air-conditioning control provide the users (U1, U2, U3) having a low concentration degree with an environment which allows them to be relaxed and concentrated easily, and also provide the users (U1, U2, U3) having a high concentration degree with an environment which makes them keep the current state. Accordingly, the air-conditioning control improves or maintains the concentration degree of each user, thereby improving an average concentration degree of the whole users (U1, U2, U3) in the room (r1), and the workability of the users (U1, U2, U3) as well.

<Advantages>

The indoor environment influences the concentration degree of the users (U1, U2, U3). The estimation unit (66) of the arithmetic device (60) estimates the concentration degree of the user (U1, U2, U3) based on the image of the user (U1, U2, U3) taken by the camera (26) and the room environment information which is the sensing result of the room environment information sensor (13) (such as the temperature of the room (r1)). Thus, the concentration degree of the user (U1, U2, U3) can be accurately recognized.

The image shows the motion and state of the user (U1, U2, U3) representing the concentration degree of the user (U1, U2, U3). The estimation unit (66) extracts the motion and state of the user (U1, U2, U3) from the image to estimate the concentration degree of the user (U1, U2, U3). This improves the estimation accuracy of the concentration degree of the user (U1, U2, U3).

The difference in age and sex may influence the degree of ease and difficulty in concentration. Accordingly, the estimation unit (66) performs an arithmetic operation to obtain the age and sex of the user (U1, U2, U3) from the image, and estimates the concentration degree by additionally using the result of the arithmetic operation. This further improves the estimation accuracy of the concentration degree of the user (U1, U2, U3).

The camera (26) is provided for the air conditioner (10) installed in the ceiling. Therefore, the camera (26) can take the image of the user (U1, U2, U3) in the room (r1) with reduced possibility that the user (U1, U2, U3) is blocked by some obstacles.

The estimation unit (66) estimates the concentration degrees of users (U1, U2, U3) present in the room (r1). Thus, in this embodiment, the concentration degree of each user (U1, U2, U3) can be recognized.

The user (U1, U2, U3) may naturally show a motion and state according to his or her concentration degree. Details of the motion and state may be different for each user (U1, U2, U3). Therefore, the estimation unit (66) uses the user information (63) representing the motion and state that each user (U1, U2, U3) naturally shows according to their own concentration degree to check against the motion and state of the user (U1, U2, U3) shown in the image actually taken. This further improves the estimation accuracy of the concentration degree of each user (U1, U2, U3).

The control unit (14) of the air conditioner (10) controls the air-conditioning operation (the first air-conditioning operation) based on the concentration degree estimated by the estimation unit (66) of the arithmetic device (60) so that the concentration degree of the user (U1, U2, U3) increases. Hence, even if the user (U1, U2, U3) does not give an instruction to the air conditioner (10) to execute an air-conditioning operation that helps the concentration to increase by operating the remote controller (30) or the like, the air conditioner (10) automatically performs the air-conditioning operation suitable for urging the concentration degree of the user (U1, U2, U3) to improve. This improves the convenience of the user (U1, U2, U3), and easily makes the user (U1, U2, U3) to be concentrated.

In particular, since the estimation accuracy of the concentration degree of the users (U1, U2, U3) is improved, performing the air-conditioning operation according to the estimated concentration degree makes the concentration degree of the user (U1, U2, U3) to be improved more easily.

In particular, estimating the concentration degree of each user (U1, U2, U3) and performing an air-conditioning operation suitable for the concentration degree of each user (U1, U2, U3) make it possible to improve the concentration degree of every user (U1, U2, U3) present in the room (r1).

Learning is performed for the estimation model (67) based on the image of the user (U1, U2, U3) and the concentration degree information of the user (U1, U2, U3) received via the remote controller (30). The estimation unit (66) performs the operation of estimating the concentration degree using the estimation model (67) that has learned. This further improves the estimation accuracy of the concentration degree of the user (U1, U2, U3).

Learning is performed for the estimation model (67) based on the result of recognition of the actual concentration degree of the user (U1, U2, U3) from the image taken by the camera (26) after the air-conditioning operation performed based on the estimation result of the estimation unit (66). More specifically, learning is performed for the estimation model (67) based on a change in the motion and state based on which the concentration degree of the user (U1, U2, U3) has been determined through comparison between the image taken by the camera (26) after the air-conditioning operation (first air-conditioning operation) performed based on the estimation result of the estimation unit (66) and the image taken by the camera (26) before the air-conditioning operation (first air-conditioning operation). Here, the change in the motion and state based on which the concentration degree of the user (U1, U2, U3) has been determined is a decrease in the frequency of the motion and state, or an absence of the motion and state. As a result, whether the estimation result of the estimation model (67) matches the actual concentration degree or not can be determined with more accuracy, and the accuracy of the estimation model (67) further improves so that the estimation result of the estimation model (67) matches the actual concentration degree as much as possible. Performing the operation of estimating the concentration degree of the user (U1, U2, U3) using the estimation model (67) that has learned further improves the estimation accuracy of the concentration degree of the user (U1, U2, U3).

Second Embodiment

In the present embodiment, the air-conditioning control apparatus (50) of the first embodiment further includes a thermographic sensor (128) (corresponding to a surface temperature measuring unit), and the estimation unit (66) additionally uses the sensing result of the thermographic sensor (128) for estimating the concentration degree of the user (U1, U2, U3).

FIG. 8 is a view corresponding to FIG. 4 of the first embodiment, and is a conceptual diagram illustrating input and output of the estimation model (67) in estimation of the concentration degree according to the present embodiment. As shown in a dashed box in FIG. 8, the estimation model (67) in the estimation unit (66) is previously constructed as a neural network dedicated for determining the concentration degree of the user (U1, U2, U3) from the data of the taken image and the room environment information through an arithmetic operation, similarly to that of the first embodiment. Specifically, the estimation model (67) is mainly a two-layer neural network including an image processing neural network (67*a*) and a concentration degree estimation neural network (67*b*).

Similarly to the first embodiment, this embodiment shows an example in which the room environment information, which is the sensing result of the room environment information sensor (13), undergoes a predetermined arithmetic operation in an arithmetic neural network (67*c*) of the estimation model (67) to be converted to data that can be handled by the concentration degree estimation neural network (67*b*), and then is inputted to the concentration degree estimation neural network (67*b*).

The input and output of the image processing neural network (67*a*) are the same as those of the first embodiment.

The concentration degree estimation neural network (67*b*) receives the results of extraction and arithmetic operation of the image processing neural network (67*a*), the information about the sensing result of the room environment information sensor (13), and the sensing result of the thermographic sensor (128).

The thermographic sensor (128) measures the surface temperature of each user (U1, U2, U3) in the room (r1). The thermographic sensor (128) may be attached anywhere in the room (r1) without any particular limitations, and may be incorporated in, for example, the remote controller (30), or may be attached to the bottom surface (21) of the air conditioner (10).

As shown in FIG. 8, similarly to the sensing result of the room environment information sensor (13) that undergoes arithmetic processing in the arithmetic neural network (67*c*), the sensing result of the thermographic sensor (128) may undergo a predetermined arithmetic operation in another arithmetic neural network (67*d*), and then be inputted to the concentration degree estimation neural network (67*b*).

In the concentration degree estimation neural network (67*b*), the concentration degree of each user (U1, U2, U3) is obtained based on the extraction result of the image processing neural network (67*a*) and the room environment information in the same manner as in the first embodiment. In this case, the user information (63) is used as a reference in the same manner as in the first embodiment. In addition to the result of arithmetic operation (age and sex) of the image processing neural network (67*a*), the sensing result (surface temperature) of the thermographic sensor (128) is also taken into account in the calculation of the concentration degree of the user (U1, U2, U3).

As shown in FIG. 9, the sensing result of the thermographic sensor (128) may also be used for the updating of the estimation model (67), together with the results of extraction and arithmetic operation of the image processing neural network (67*a*) and the information about the sensing result of the room environment information sensor (13).

Other than the features described with reference to FIGS. 8 and 9, i.e., the configuration of the air-conditioning system (100) using the air-conditioning control apparatus (50), the user information (63), and the air-conditioning operation using the estimation result are the same as those described in the first embodiment, and will not be described below.

In the present embodiment, the actual surface temperature of the user (U1, U2, U3) is additionally used to estimate the concentration degree of the user (U1, U2, U3). This further improves the estimation accuracy of the concentration degree of the user (U1, U2, U3). The air conditioner (10) can perform the air-conditioning operation suitable for urging the concentration degree of the user (U1, U2, U3) to improve.

The sensing result of the thermographic sensor (128) may also be used by the control unit (14) to determine whether the temperature and volume of the air supplied from the air conditioner (10) to the user (U1, U2, U3) are appropriate for the user (U1, U2, U3). For example, if the air is excessively supplied to the user (U1, U2, U3) even though it is intended to improve the concentration degree of the user (U1, U2, U3), the surface temperature of the user (U1, U2, U3) may be lowered or raised too much. This may excessively stimulate the user (U1, U2, U3), and may eventually disturb the concentration. Therefore, if the air conditioner (10) determines from the sensing result of the thermographic sensor (128) that the temperature and volume of the air supplied to the user (U1, U2, U3) are inappropriate for the user (U1, U2, U3), the control unit (14) preferably adjusts the particular of air-conditioning control so as to moderate the temperature and volume of the air supplied based on the sensing result of the thermographic sensor (128).

Other Embodiments

In the first and second embodiments, the image and the $CO_2$ concentration among the pieces of room environment information may be used to additionally perform air-conditioning control for improving the concentration degree. For example, the higher the $CO_2$ concentration is, the more humans become sleepy and their concentration is lowered. Accordingly, the control unit (14) of the air conditioner (10) may execute the particular of air-conditioning control to perform ventilation so as to lower the $CO_2$ concentration. The particular of air-conditioning control may be, for example, increasing the ventilation time with the increase in the number of humans with a low concentration degree.

Air-conditioning control for improving the concentration degree may be additionally performed in accordance with time of day. For example, humans become sleepy and their concentration is lowered after lunch. Thus, in a preferred embodiment, the control unit (14) of the air conditioner (10) temporarily sets a target temperature of the room (r1) in the afternoon to be lower than that in the morning. Further, how much to lower the target temperature may be adjusted depending on the $CO_2$ concentration.

In the first and second embodiments, the estimation unit (66) may additionally use the sensing results of the heart rate and electroencephalogram of each user (U1, U2, U3) to estimate the concentration degree of the users (U1, U2, U3).

At this time, the concentration degree of the user (U1, U2, U3) may be obtained through analysis of the sensing results of the heart rate and electroencephalogram by deep learning. Thus, the concentration degree of each user (U1, U2, U3) can be recognized more finely. The heart rate and electroencephalogram of each user (U1, U2, U3) may be calculated as information representing the state of each user (U1, U2, U3) from the image taken by the camera (26), or may be sensed by a sensor provided separately from the camera (26) to detect the heart rate and the electroencephalogram. The heart rate and electroencephalogram of each user (U1, U2, U3) may be used for the learning of the estimation model (67).

The control unit (14) may control the air-conditioning operation using the age and sex of each user (U1, U2, U3) calculated from the image so that an effective air-conditioning operation that further improves the concentration degree of each individual is separately performed.

In the first and second embodiments, a sensor different from the suction sensor may be provided as the room environment information sensor (13). The information about the room sensed by the room environment information sensor (13) is not limited to the temperature, humidity, and $CO_2$ concentration in the room (r1), and may include various types of information about the environment in the room (r1). The sensing result of the room environment information sensor (13) may be the temperature or $CO_2$ concentration in the room (r1) only.

The concentration degree information of the user (U1, U2, U3) inputted via the remote controller (30) may be used for fine adjustment and learning of the control of the air-conditioning operation (corresponding to the first air-conditioning operation). The image newly taken by the camera (26) may also be used not only for the updating of the estimation model (67), but also for fine adjustment and learning of the control of the air-conditioning operation (corresponding to the first air-conditioning operation), similarly to the concentration degree information.

Examples of the fine adjustment and learning of the control of the air-conditioning operation include fine adjustment and learning of target values of the rotational speed of the indoor fan (12) ([first specific example]), the temperature of the conditioned air supplied to the user (U1, U2, U3) and the position of the flap (16) ([second specific example]), and the $CO_2$ concentration ([third specific example]), which are used in the air-conditioning operation for improving (increasing) the concentration degree. The specific examples will be described below.

FIRST SPECIFIC EXAMPLE

Suppose that the estimation unit (66) has estimated that the concentration degree of the user (U1, U2, U3) is less than or equal to a predetermined value and the user is out of concentration. For this user (U1, U2, U3), the control unit (14) of the air conditioner (10) controls the rotational speed of the indoor fan (12) and the position of the flap (16) to start the supply of the fluctuating airflow in a small air volume (fluctuation operation).

Thereafter, the camera (26) newly takes an image. Using this image, the estimation unit (66) re-estimates the concentration degree of the user (U1, U2, U3) to which the fluctuating airflow is supplied. As a result, if the concentration degree of the user (U1, U2, U3) is still less than or equal to the predetermined value and the concentration is not improved, the control unit (14) performs control such that the indoor fan (12) rotates at a higher speed. Thus, the volume of the fluctuation airflow becomes greater than that already supplied (small air volume).

In this case, the control unit (14) does not control the position of the flap (16). Therefore, if the air volume is changed, the direction of the air remains the same.

Thereafter, the camera (26) newly takes an image again. If the concentration degree has become equal to or larger than the predetermined value as a result of the re-estimation of the concentration degree of the user (U1, U2, U3) from the image by the estimation unit (66), it can be determined that the concentration of the user (U1, U2, U3) has increased and the concentration degree has been improved. At this time, the control unit (14) learns the control of the fluctuation operation required for improving (increasing) the concentration degree of the user (U1, U2, U3), and sets (increases) the target value of the rotational speed of the indoor fan (12) to the final value so that the value can be used for the subsequent air-conditioning operation (first air-conditioning operation). That is, in the next fluctuation operation, the supply of the fluctuating airflow at the learned air volume is automatically started. Therefore, the air-conditioning operation (first air-conditioning operation) to be performed next easily and reliably improves the concentration degree of the user (U1, U2, U3).

On the other hand, if the concentration degree of the user (U1, U2, U3) is less than or equal to the predetermined value even through the supply of the fluctuating airflow at a volume increased to a certain level, the control unit (14) stops the fluctuation operation. This is because if the conditioned air is excessively supplied at a large volume to the user (U1, U2, U3), the concentration degree of the user (U1, U2, U3) decreases and deviates from the predetermined value.

In a preferred embodiment, the fluctuation operation is stopped when the concentration degree of the user (U1, U2, U3) is still less than or equal to the predetermined value, for example, even if the volume of the fluctuating airflow is increased in two stages (i.e., even if the rotational speed of the indoor fan (12) is increased in two stages).

Simultaneously with the control of the fluctuation operation, the control unit (14) may perform at least one of the adjustment of the room temperature or the adjustment of the $CO_2$ concentration in the room described in the first embodiment.

SECOND SPECIFIC EXAMPLE

With respect to the user (U1, U2, U3) whose concentration degree is estimated to be less than the threshold value by the estimation unit (66), the control unit (14) of the air conditioner (10) performs control such that the temperature of the conditioned air is lowered to the target value and the position of the flap (16) is adjusted, when the air conditioner (10) is performing the cooling operation. As a result, the air conditioner (10) supplies the cooler conditioned air to the user (U1, U2, U3) whose concentration degree is estimated to be less than the threshold value by the estimation unit (66). For example, to lower the temperature of the conditioned air to the target value, the control unit (14) controls the air conditioner by temporarily setting the target temperature to be lower by 2° C. than the currently set target temperature, thereby lowering the temperature of the conditioned air.

Thereafter, the camera (26) newly takes an image. Using this image, the estimation unit (66) re-estimates the concentration degree of the user (U1, U2, U3) to which the conditioned air is supplied. If the concentration degree of the user (U1, U2, U3) does not become equal to or more than the threshold value as a result of the re-estimation, the control unit (14) performs control such that the temperature of the conditioned air is further lowered and the position of the flap (16) is adjusted with respect to the position of the user (U1, U2, U3). As a result, the air conditioner (10) supplies the conditioned air, which is cold air at a further lowered temperature, to the user (U1, U2, U3). Specifically, the control unit (14) additionally lowers the target temperature that has been temporarily lowered by 2° C. by 2° C., i.e., temporarily sets the target temperature to be lower than the originally set target temperature by 4° C., and controls the air-conditioning operation of the air conditioner (10).

Thereafter, the camera (26) newly takes an image again. If the concentration degree has become equal to or larger than the predetermined value as a result of the re-estimation of the concentration degree of the user (U1, U2, U3) from the image by the estimation unit (66), it can be determined that the concentration degree of the user (U1, U2, U3) has been improved. In this case, the control unit (14) learns the coolness of the conditioned air (i.e., how much the temperature of the conditioned air is lowered) required for improving the concentration degree of the user (U1, U2, U3), and sets (lowers) the target value to the final temperature of the conditioned air so that the conditioned air at this temperature is supplied from the subsequent operation.

The control unit (14) may not control the position of the flap (16), and may control the air-conditioning operation of the air conditioner (10) so that the temperature of the entire room (r1) is lowered. The humidity of the conditioned air may be adjusted alternatively or additionally to the adjustment of the set temperature of the conditioned air.

The first specific example may be combined with the second specific example.

Further, the second specific example can also be applied to the heating operation. During the heating operation, the control unit (14) performs control such that the set temperature is not lowered but raised.

THIRD SPECIFIC EXAMPLE

Depending on the concentration degree of the user (U1, U2, U3), the control unit (14) may adjust the $CO_2$ concentration in the room (r1) by additionally adjusting the operation of a ventilation fan (not shown) in the room (r1). This adjustment may be combined with at least one of the first or second specific example. If this example is combined with the first specific example, the "conditioned air" may be cold air.

To adjust the $CO_2$ concentration, the control unit (14) may operate the ventilation fan (not shown) to make the $CO_2$ concentration equal to or less than a predetermined value if the concentration degree of the user (U1, U2, U3) is less than the threshold value, in addition to at least one of the first or second specific example. In this case, the control unit (14) determines whether or not the time taken until the concentration degree of the user (U1, U2, U3) is improved is shortened, or how much the time is shortened, as compared to the case where the ventilation fan (not shown) is not operated (i.e., only at least one of the first or second specific example is employed), and learns the $CO_2$ concentration at which the concentration degree is improved as the target value.

Accordingly, from the subsequent operation, the ventilation fan (not shown) is automatically operated taking the $CO_2$ concentration into consideration to improve the concentration degree of the user (U1, U2, U3). Therefore, the air-conditioning operation (first air-conditioning operation) to be performed next easily improves the concentration degree of the user (U1, U2, U3).

Additionally, the control unit (14) may learn what kind of air-conditioning operation is to be performed by the air conditioner (10) for improving the concentration degree of each user (U1, U2, U3), and what kind of air-conditioning operation is to be performed for which of the users (U1, U2, U3) at different positions in the room (r1) to improve the concentration degree.

In the learning of such air-conditioning control, what (concentration degree information) is inputted by the user (U1, U2, U3) via the remote controller (30) described in the first and second embodiments may also be used. That is, using the concentration degree information inputted after the air-conditioning control, the control unit (14) may determine whether or not the current air-conditioning control is effective for improving (increasing) the concentration degree, and may update the particular of the air-conditioning control by learning. In this case, the control unit may construct a control model used for the air-conditioning control, and may learn for the control model.

In the first and second embodiments, it has been described that the image shows the motion and state of the user (U1, U2, U3) representing the concentration degree of the user (U1, U2, U3). However, the image may show at least one of the motion or state of the user (U1, U2, U3). In this case, the extraction result of the image processing neural network (67a) is at least one of the motion or state of the user (U1, U2, U3).

The result of the arithmetic operation for obtaining the sex and age of the user (U1, U2, U3) is not necessarily used for the estimation of the concentration degree.

If the sex and age of the user (U1, U2, U3) are used for the estimation of the concentration degree, one of the sex or age of the user (U1, U2, U3) may be used for the estimation of the concentration degree.

The air conditioner (10) is not limited to the one installed in the ceiling of the room (r1), and may be an air conditioner installed on a wall surface or a floor.

The camera (26) may be attached anywhere as long as it can take the image of the user (U1, U2, U3) in the room (r1), and is not necessarily provided for the air conditioner (10). For example, the camera (26) may be a web camera mounted on a personal computer owned by the user (U1, U2, U3).

The air-conditioning control apparatus (50) of the first and second embodiments can also be applied to the case where a single user is present in the room (r1).

In addition, if users are present in the room (r1), the air-conditioning control apparatus (50) does not necessarily estimate the concentration degree of every user, and may perform the estimation for any of the users.

The estimation unit (66) does not necessarily use the user information (63) for the estimation of the concentration degree.

It is not always necessary to control the air-conditioning operation of the air conditioner (10) based on the estimation result of the concentration degree. Therefore, the concentration degree estimation apparatus may be the one that only estimates the concentration degree.

The updating operation of the estimation model (67) may not be performed.

In the case of performing the updating operation of the estimation model (67), the parameter to be used for updating the estimation model (67) may be the same or different from that used for estimating the concentration degree. For example, the parameter used for estimating the concentration degree may be at least one of the image, the temperature and humidity of the room, the temperature and humidity of the air blown out from the air outlet (24), the volume of the air, the direction of the air, or the air conditioning capacity. The parameter used for updating the estimation model (67) may be at least one of the image, the temperature and humidity of the room, the speed of the air, the radiation temperature, or the $CO_2$ concentration.

In the first and second embodiments, it has been described that the concentration degree is estimated by using the estimation model (67) constructed by the neural network, but the concentration degree may be estimated, for example, by executing a program, without using the estimation model (67).

The control of the air-conditioning operation may be performed by the arithmetic device (60) in place of the control unit (14).

In the first and second embodiments, it has been described that the "remote controller (30)" is used as the receiving unit that receives the concentration degree information inputted. However, the receiving unit may be configured as a device other than the remote controller, such as a smartphone, a tablet, or a personal computer. Further, the concentration degree information may be inputted by voice.

INDUSTRIAL APPLICABILITY

As described above, the present invention is useful for a concentration degree estimation apparatus for estimating a concentration degree of a user.

DESCRIPTION OF REFERENCE CHARACTERS

10 Air Conditioner
13 room environment information Sensor (sensor)
14 Control Unit
26 Camera (Imaging Unit)
30 Remote Controller (Receiving Unit)
50 Air-Conditioning Control Apparatus (Concentration Degree Estimation Apparatus)
62 Storage Unit
63 User Information
66 Estimation Unit
67 Estimation Model
68 Model Updating Unit
U1, U2, U3 User
128 Thermographic Sensor (Surface Temperature Measuring Unit)

The invention claimed is:

1. A concentration degree estimation apparatus, comprising:
an imaging unit that takes an image of at least one user;
a sensor that senses room environment information about an environment in a room where the at least one user is present;
an estimation unit that estimates a concentration degree of the at least one user based on the image of the user taken by the imaging unit and the room environment information sensed by the sensor;
a control unit that controls a first air-conditioning operation of an air conditioner based on an estimation result of the estimation unit so that the concentration degree of the at least one user increases, the air conditioner targeting the room; and
a model updating unit that recognizes an actual concentration degree of the at least one user from the image taken by the imaging unit after the first air-conditioning operation performed based on the estimation result of the estimation unit, and learns for the estimation model used for estimating the concentration degree based on a recognition result if a desired change in concentration of the at least one user is not recognized from the image.

2. The concentration degree estimation apparatus of claim 1, wherein
the image shows a motion and/or state of the at least one user representing the concentration degree of the at least one user, and
the estimation unit extracts the motion and/or state of the at least one user from the image to estimate the concentration degree of the at least one user.

3. The concentration degree estimation apparatus of claim 1, wherein the estimation unit calculates sex and/or an age of the at least one user from the image, and estimates the concentration degree of the at least one user also based on the calculated sex and/or age of the at least one user.

4. The concentration degree estimation apparatus of claim 1, further comprising:
a surface temperature measuring unit that measures a surface temperature of the at least one user present in the room, wherein
the estimation unit estimates the concentration degree of the at least one user also based on a measurement result of the surface temperature measuring unit.

5. The concentration degree estimation apparatus of claim 1, wherein
the air conditioner is installed in a ceiling of the room, and the imaging unit is provided for the air conditioner.

6. The concentration degree estimation apparatus of claim 1, wherein if the at least one user includes users present in the room, the estimation unit estimates the concentration degree of each of the users.

7. The concentration degree estimation apparatus of claim 6, further comprising:
a storage unit that stores user information about the motion and/or state of each of the users associated with the concentration degree of the user who is showing the motion and/or the state,
wherein the estimation unit
extracts the motion and/or state of each of the users from the image, and
estimates the concentration degree of the user using an extraction result and the user information.

8. The concentration degree estimation apparatus of claim 1, further comprising:
a receiving unit capable of receiving concentration degree information inputted by the at least one user, the concentration degree information representing the concentration degree of the at least one user; and
a model updating unit that learns for an estimation model used for estimating the concentration degree based on the image taken by the imaging unit and/or the concentration degree information received via the receiving unit.

9. The concentration degree estimation apparatus of claim 1, wherein the model updating unit learns for the estimation model used for estimating the concentration degree based on a change in the motion and state of the at least one user based on which the concentration degree of the at least one user has been determined through comparison between the image taken by the imaging unit after the first air-conditioning operation performed based on the estimation result of the estimation unit and the image taken by the imaging unit before the first air-conditioning operation.

10. The concentration degree estimation apparatus of claim 9, wherein the change in the motion and state of the at least one user based on which the concentration degree of the at least one user has been determined is a decrease in frequency of the motion and state, or an absence of the motion and state.

11. The concentration degree estimation apparatus of claim 1, further comprising:
a receiving unit capable of receiving concentration degree information inputted by the at least one user, the concentration degree information representing the concentration degree of the at least one user, wherein
the control unit learns particular parameters or conditions for control of the first air-conditioning operation based on the concentration degree information received via the receiving unit after the first air-conditioning operation performed based on the estimation result of the estimation unit so that the concentration degree of the user increases.

12. The concentration degree estimation apparatus of claim 1, wherein the control unit learns particular parameters or conditions for control of the first air-conditioning operation based on the image taken by the imaging unit after the first air-conditioning operation performed based on the estimation result of the estimation unit so that the concentration degree of the at least one user increases.

13. The concentration degree estimation apparatus of claim 11, wherein the particular parameters or conditions for the control of the first air-conditioning operation includes at least one of a rotational speed of an indoor fan included in the air conditioner, a position of a flap for adjusting a direction of air blown out from the air conditioner, a set temperature of the air conditioner, or a target $CO_2$ concentration in the room.

* * * * *